United States Patent [19]

Tsuchihashi et al.

[11] Patent Number: 6,052,973
[45] Date of Patent: Apr. 25, 2000

[54] LIFT MECHANISM FOR REEL-TYPE CUTTING UNITS

[75] Inventors: Hironori Tsuchihashi, Wakayama; Yoshikazu Togoshi, Osaka; Koji Fujiwara; Yoshiyuki Esaki, both of Sakai; Kazuo Samejima, Kaizuka; Junichi Kitamura, Kawachinagano; Matsuo Tachibana, Takaishi; Teruo Shimamura, Nishinomiya; Osami Fujiwara, Kishiwada; Yoshihiro Kawahara, Sakai, all of Japan

[73] Assignee: Kubota Corporation, Osaka, Japan

[21] Appl. No.: 09/009,125

[22] Filed: Jan. 20, 1998

[30] Foreign Application Priority Data

Jan. 21, 1997 [JP] Japan ................................ 9-008211
Jul. 31, 1997 [JP] Japan ................................ 9-205637
Sep. 19, 1997 [JP] Japan ................................ 9-254465

[51] Int. Cl.[7] ......................................... A01D 34/53
[52] U.S. Cl. ........................................ 56/7; 56/249
[58] Field of Search ..................... 56/6, 7, 10.5, 10.8, 56/10.9, 11.1, 11.4, 11.9, 11.3, 14.9, DIG. 11, DIG. 15, DIG. 20, 15.9, 249, 294, 253, DIG. 22

[56] References Cited

U.S. PATENT DOCUMENTS 3,224,176  12/1965  Taylor ............................................ 56/7
4,769,976  9/1988  Bassett et al. .
5,297,378  3/1994  Smith .
5,623,817  4/1997  Bricko et al. .
5,628,169  5/1997  Stiller et al. .................................... 56/7
5,822,960  10/1998  Kitamura et al. ............................. 56/7

FOREIGN PATENT DOCUMENTS 5-328813  5/1992  Japan .
6-62635  8/1992  Japan .
9-121645  10/1995  Japan .

Primary Examiner—Robert E. Pezzuto
Attorney, Agent, or Firm—Ronald E. Greigg; Edwin E. Greigg

[57] ABSTRACT

A lawn tractor includes a vehicle body, a center reel-type cutting unit, and side reel-type cutting units arranged laterally of the center reel-type cutting unit with respect to a moving direction of the vehicle body, wherein a cutting track by the center reel-type cutting unit and cutting tracks by the side reel-type cutting units partly overlap one another. A first lift mechanism vertically movably connects the center reel-type cutting unit to the vehicle body, wherein the first lift mechanism is operable to raise and lower the center reel-type cutting unit without displacing the center reel-type cutting unit transversely of the moving direction. Second lift mechanisms vertically movably connect the side reel-type cutting units to the vehicle body, respectively, wherein the second lift mechanisms are operable to raise and lower the side reel-type cutting units without displacing the side reel-type cutting units transversely of the moving direction.

12 Claims, 11 Drawing Sheets

LIFT MECHANISM FOR REEL-TYPE CUTTING UNITS

BACKGROUND OF THE INVENTION

1. Field of the Invention

This invention relates to a lawn tractor having a vehicle body, a center reel-type cutting unit, side reel-type cutting units arranged laterally of the center reel-type cutting unit with respect to a moving direction of the vehicle body, a first lift mechanism for vertically movably connecting the center reel-type cutting unit to the vehicle body, and second lift mechanisms for vertically movably connecting the side reel-type cutting units to the vehicle body.

2. Description of the Related Art

A riding lawn tractor having the above construction is disclosed in Japanese Patent Laying-Open Publication H5-328813, for example. This tractor includes a support frame projecting forward from the front of the vehicle body and pivotable about an axis extending transversely of the moving direction of the tractor body. The center reel-type cutting unit is connected to a free end of the support frame. Swing arms are arranged at opposite sides of an intermediate portion of the support frame to be pivotable about axes extending in the moving direction of the vehicle body. The side reel-type cutting units are connected to free ends of the right and left swing arms. The side cutting units are movable up and down with pivotal movement of the respective swing arms to vary spaces between reel blades and the ground.

In this type of lawn tractor, each reel-type cutting unit has ground-engaging wheels. With a support system allowing each cutting unit to move vertically as the ground-engaging wheels follow the ground, the cutting unit is movable up and down in response to unevenness of the ground. However, where, as in the conventional tractor, the right and left side reel-type cutting units are connected to the swing arms pivotable about the axes extending in the moving direction of the tractor body, the side cutting units, when raised and lowered, are displaceable transversely of the moving direction of the tractor body. As a result, cutting tracks also are displaceable transversely of the moving direction of the tractor body.

In the lawn tractor having a plurality of reel-type cutting units in juxtaposition, the cutting units describe cutting tracks transversely overlapping one another to leave no uncut patches. Where the cutting tracks are transversely displaceable with vertical movement of the cutting units as noted above, it is necessary for the cutting tracks to overlap by sufficient amounts to leave no uncut patches despite variations of the cutting tracks occurring during a cutting operation. This lowers the cutting efficiency of the respective cutting units.

SUMMARY OF THE INVENTION

The object of this invention is to provide a lawn tractor having a center reel-type cutting unit and side reel-type cutting units, with lift mechanisms for the cutting units which produce no variations in cutting tracks due to unevenness of the ground.

The above object is fulfilled, according to this invention, by a lawn tractor comprising a vehicle body, a center reel-type cutting unit, side reel-type cutting units arranged laterally of the center reel-type cutting unit with respect to a moving direction of the vehicle body, wherein a cutting track by the center reel-type cutting unit and cutting tracks by the side reel-type cutting units partly overlap one another, a first lift mechanism for vertically movably connecting the center reel-type cutting unit to the vehicle body, wherein the first lift mechanism is operable to raise and lower the center reel-type cutting unit without displacing the center reel-type cutting unit transversely of the moving direction, and second lift mechanisms for vertically movably connecting the side reel-type cutting units to the vehicle body, respectively, wherein the second lift mechanisms are operable to raise and lower the side reel-type cutting units without displacing the side reel-type cutting units transversely of the moving direction.

With this construction, when an operation is carried out with the reel-type cutting units following the ground, each cutting unit moves up and down following any unevenness of the ground without displacing transversely, and thus no variation occurs in the entire cutting track. Consequently, an amount of overlap of the cutting tracks transversely of the cutting units may be set to a minimum to improve cutting efficiency.

Further, as one simple construction to realize the lift mechanisms of this invention, it is proposed that the first lift mechanism includes a first arm pivotable about a pivotal axis: X extending transversely of the moving direction, the center reel-type cutting unit being attached to a free end of the first arm through coupling means, and each of the second lift mechanisms includes a second arm pivotable about a pivotal axis: X extending transversely of the moving direction, each of the side reel-type cutting units being attached to a free end of the first arm through coupling means. In this case, the pivotal axis of the first arm and the pivotal axis of the second arm may be arranged coaxially to provide advantages in terms of space and construction.

In another embodiment of this invention, each of the center reel-type cutting unit and the side reel-type cutting units has a lower operative position and an upper inoperative or running position, and includes a restricting mechanism for stopping a reel blade when the running position is assumed. With this construction, when one of the cutting units is maintained in the inoperative position, this cutting unit is stopped rotating. Thus, the cutting unit is never driven wastefully. Especially since the reel-type cutting units have fixed blades placed in contact with the rotating reel blades, the cutting unit not in use is maintained out of operation to avoid heating due to a friction between the reel blade and fixed blade, thereby to protect the cutting unit from damage.

In a further embodiment this invention, the coupling means have a yawing axis: Z for permitting each of the reel-type cutting units to yaw relative to the vehicle body. With this construction, when the lawn tractor engages in a grass cutting operation while making a turn, a steering operation causes the forward end of the vehicle body to turn toward the center of turning. Then, each reel-type cutting unit having a point of traction and a ground engaging point separate from each other in the fore and aft direction is subjected to an angular moment about a vertical axis due to a ground resistance and lateral grass resistance. As a result, the cutting unit yaws in horizontal posture about the vertical axis, which suppresses rolling of the cutting unit. This leaves neat cutting trails with no transverse irregularities.

The yawing axis: Z may be inclined to give a caster angle to a ground-engaging wheel of each of the reel-type cutting units. That is, an intersection of an extension line of the yawing axis and the ground is disposed forwardly of the ground-engaging point of the ground-engaging wheel. This construction produces a caster action for causing the cutting unit to yaw in a direction to absorb a discrepancy between a facing direction and an actual turning direction. This suppresses or eliminates rolling of the cutting unit in a direction to raise an outer end thereof with respect to the turning, thereby leaving neat cutting trails. Where the yawing axis extends vertically, the pivotal connection is disposed forwardly of the ground-engaging wheel, resulting in an enlarged construction. Where the yawing axis is inclined rearward in particular to produce a caster action, the point of traction located on a vertical axis and above the cutting unit, i.e. the pivotal connection between the arm and cutting unit, may be displaced rearward to realize a compact construction.

The coupling means may have a rolling axis: Y for permitting each of the reel-type cutting units to roll relative to the vehicle body. This feature enables a concentrated pivotal structure which contributes toward compactness.

Other features and advantages of this invention will be apparent from the following description of embodiments to be taken in conjunction with the drawings.

DESCRIPTION OF THE PREFERRED EMBODIMENTS

Embodiments of this invention will be described hereinafter with reference to the drawings.

Figure 1:
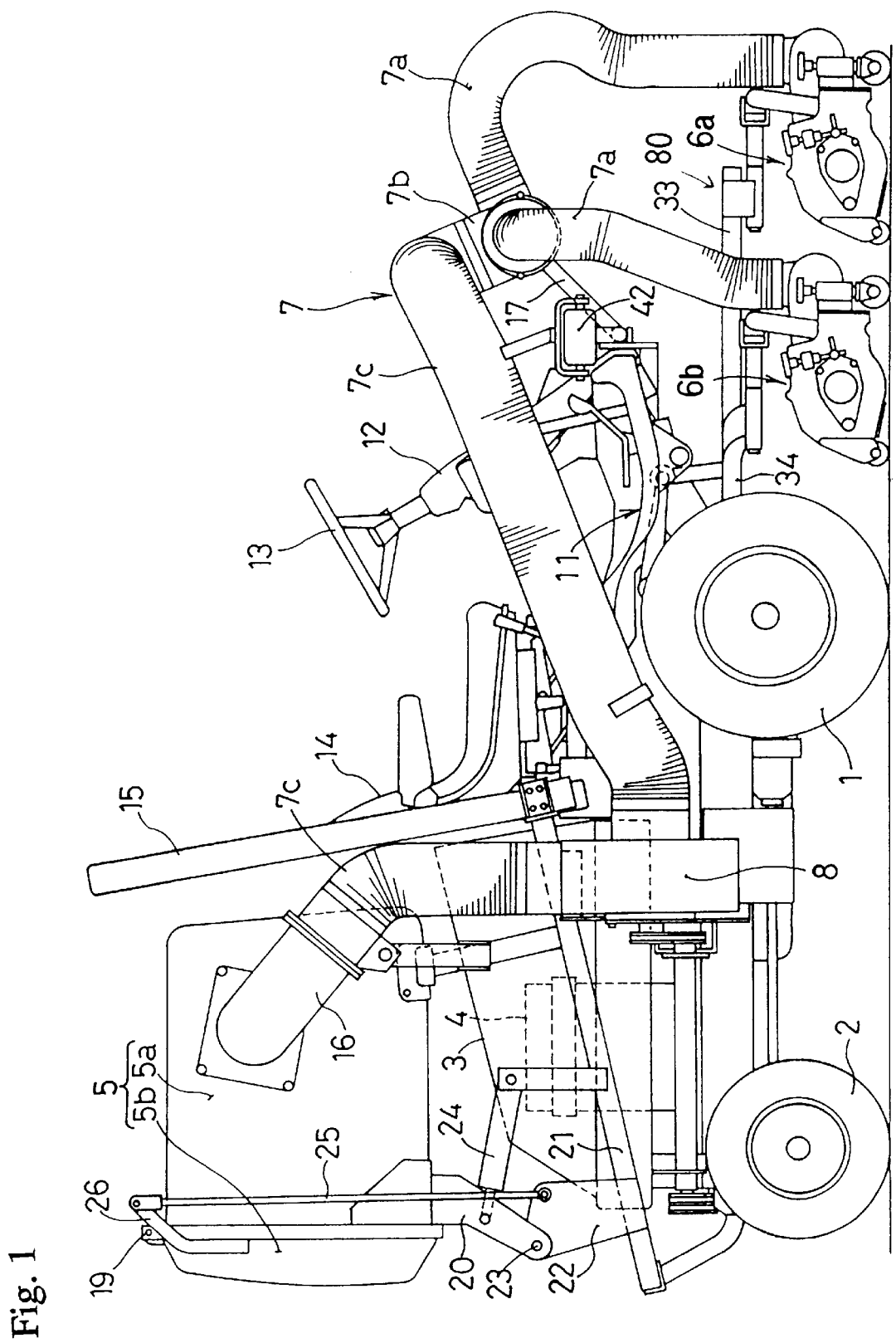
FIG. 1 is a side elevation of a lawn tractor.
Figure 2:
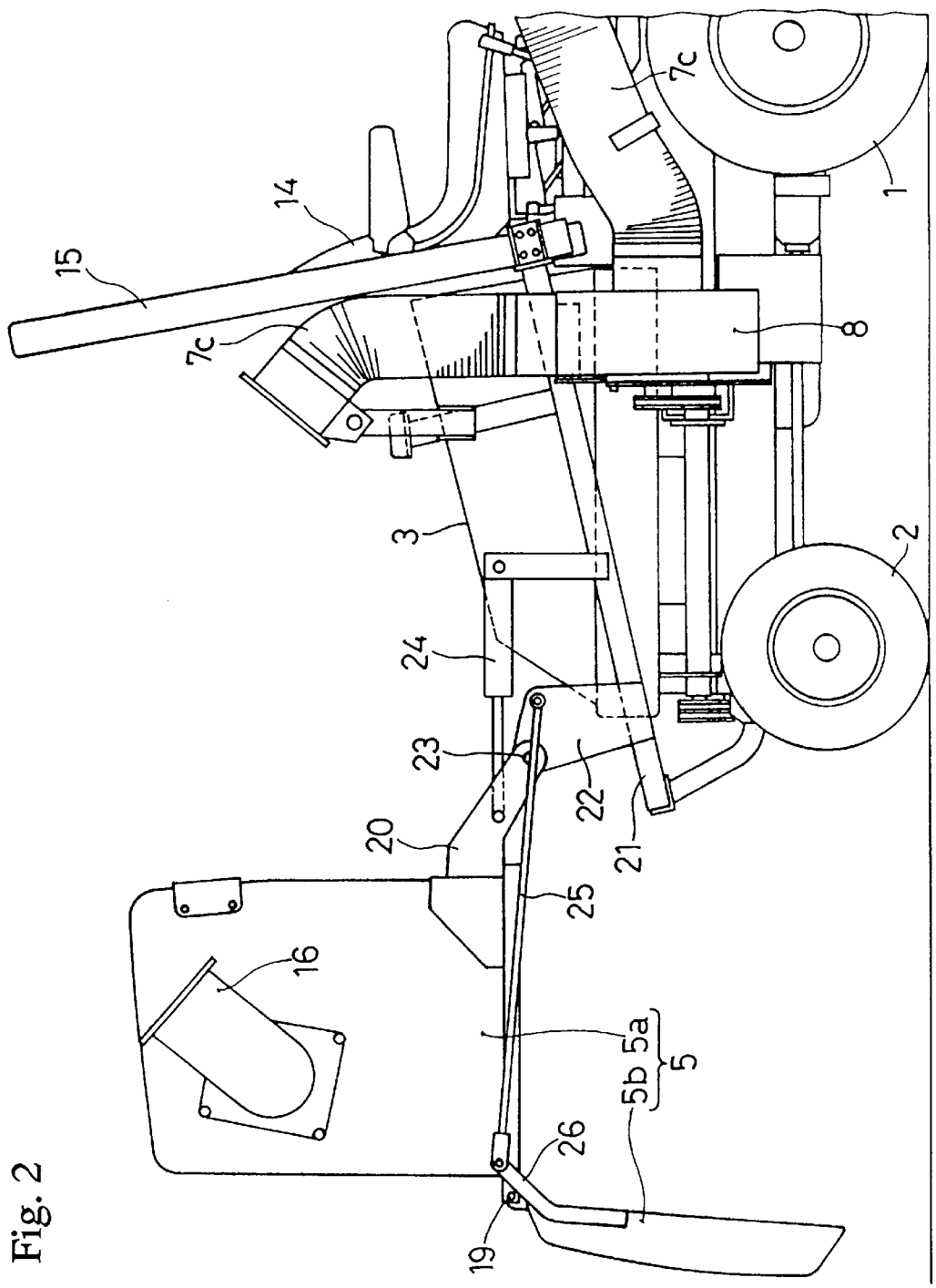
FIG. 2 is a side view of a grass catcher in a discharge position.

As shown in FIGS. 1 and 2, a riding lawn tractor includes a vehicle body having front drive wheels 1 and dirigible rear drive wheels 2. An engine hood 3 enclosing an engine 4 is disposed in a rearward position of the vehicle body. A grass catcher 5 is disposed above the engine hood 3. The tractor further includes three reel-type cutting units, i.e. a center reel-type cutting unit 6a and side reel-type cutting units 6b, vertically movably connected to a forward end of the vehicle body. Grass clippings are transmitted from the respective cutting units 6a and 6b to the grass catcher 5 through a duct 7 and a suction blower 8.

Figure 5:
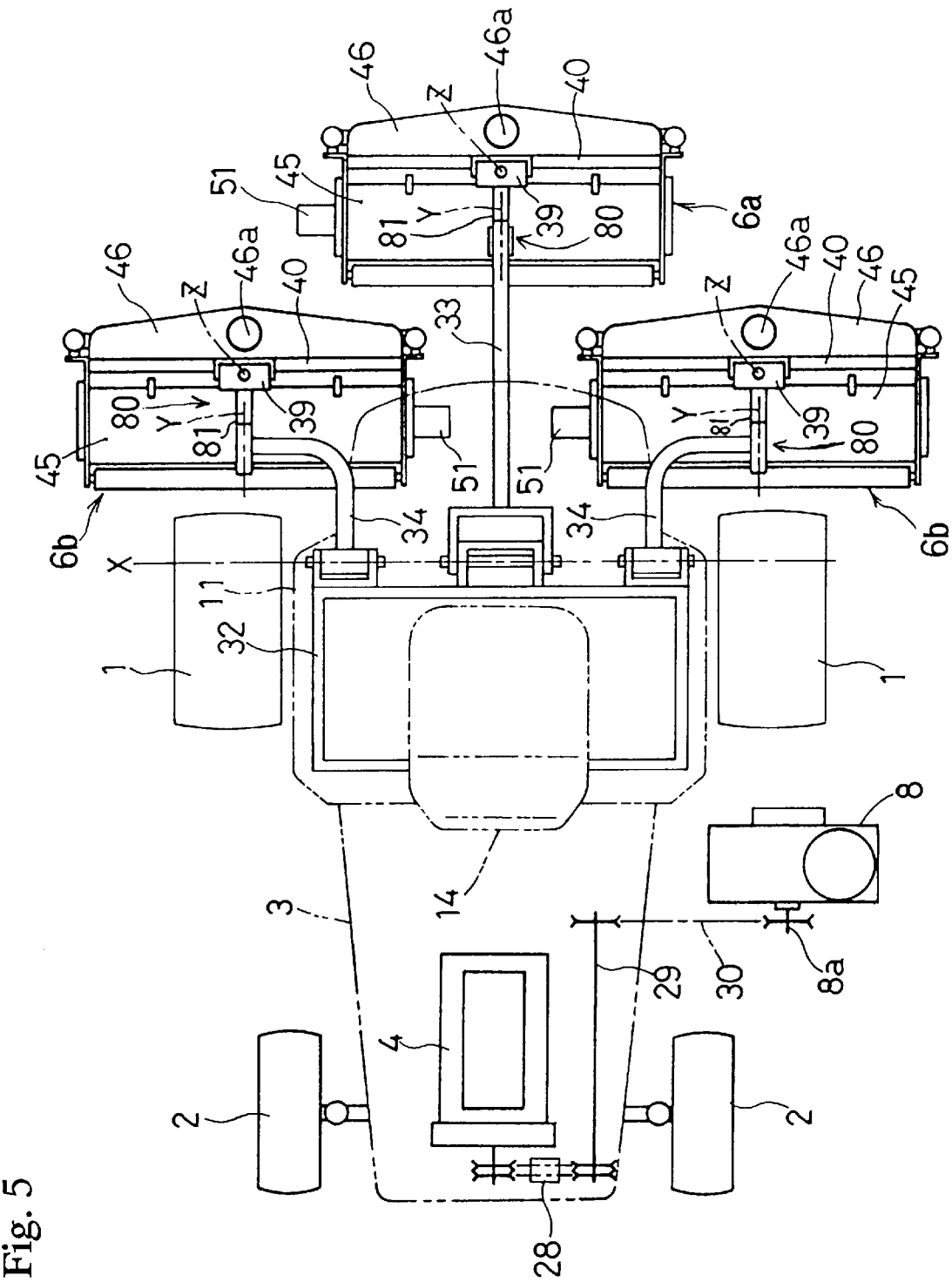
FIG. 5 is a schematic plan view of the lawn tractor.

A footrest 11 is formed on the vehicle body to open forwardly and laterally thereof. A steering column 12 is erected at the front of footrest 11, with a steering wheel 13 attached to an upper end of steering column 12. A driver's seat 14 is disposed rearwardly of footrest 11. Further, a loop-like protector frame 15 is provided for protecting upper and lateral areas of driver's seat 14. As shown in FIG. 5, the center reel-type cutting unit 6a is disposed in a middle position transversely of the vehicle body. The side reel-type cutting units 6b are arranged at opposite sides rearwardly of the center cutting unit 6a. The side cutting units 6b have cutting widths (cutting tracks) whose inward areas overlap opposite side areas of a cutting width (cutting track) of the center cutting unit 6a.

The duct 7 includes three first flexible ducts 7a for transmitting grass clippings from the three reel-type cutting units 6a and 6b, respectively, a merging member 7b for joining the three first ducts 7a at the front of the vehicle body, and a second flexible duct 7c having a larger diameter than the first ducts 7a for transmitting grass clippings from the merging member 7b. The second duct 7c extends from the front to a lateral position of the vehicle body. The suction blower 8 is disposed in an intermediate position of the second duct 7c extending laterally of the vehicle body. Grass clippings delivered upward from the suction blower 8 through the second duct 7c enter a receiving tube 16 of grass catcher 5 through an opening formed in oblique posture at the upper end of the second duct 7c. The merging member 7b is formed of metal, and includes a cylindrical portion opening forward, right and left for connection to the first ducts 7a, and a cylindrical portion opening upward for connection to the second duct 7c. The merging member 7b is fixedly supported by a prop 17 in a forward and transversely middle position of the vehicle body.

As shown in FIG. 1, the portion of the second duct 7c forwardly of the suction blower 8 extends obliquely from the highest position right over the connection to the merging member 7b to the lowest position at the connection to the suction blower 8. This posture allows little chance of grass clippings remaining in the second duct 7c.

As shown in FIG. 1, the grass catcher 5 includes a main container body 5a defining an opening directed rearward in the posture shown, and a lid 5b attached to an upper edge of the opening through hinges 19. The grass catcher 5 has a bracket 20 disposed under the opening. A lower end of the bracket 20 is connected to a stay 22 formed on a support frame 21 in the rearward position of the vehicle body to be pivotable about transverse support pins 23. Thus, the entire grass catcher 5 is switchable between a grass collecting position shown in FIG. 1 and a grass discharge position shown in FIG. 2. The grass clippings delivered from the receiving tube 16 along with air flows fall by gravitation as the air flows slow down within the grass catcher 5. Air is released outside the grass catcher 5 from an upper interior space thereof through exhaust passages (not shown) formed in a rear surface of lid 5b.

A discharge cylinder 24 extends between the bracket 20 and support frame 21 for switching positions of the main container body 5a of the grass catcher. A link 25 extends between the stay 22 and an arm 26 connected to the lid 5b for opening and closing the lid 5b in response to position switching of the main container body 5a. When the discharge cylinder 24 is contracted, the main container body 5a is placed in the grass collecting position, and the lid 5b is closed as shown in FIG. 1. When the discharge cylinder 24 is extended, the main container body 5a is switched to the grass discharge position as shown in FIG. 2. In this position, the receiving tube 16 is separated from the upper end of the second duct 7c, and the opening of main container body 5a is directed downward with the lid 5b opened, to discharge grass clippings.

As shown in FIG. 5, the suction blower 8 includes a drive shaft 8a extending in the fore and aft direction. Power of engine 4 is transmitted to the drive shaft 8a through a belt tension type clutch 28, a transmission shaft 29 extending in the fore and aft direction, and a belt transmission mechanism 30 extending between the transmission shaft 29 and drive shaft 8a.

As shown in FIG. 5, a first arm 33 extending in the fore and aft direction of the vehicle body is connected to a transversely middle position at the forward end of a body frame 32 to be pivotable about a transverse axis X. Second arms 34 shaped to bend outwardly of the vehicle body as they extend forward are connected to opposite, right and left ends at the forward end of body frame 32 to be pivotable about the transverse axis X. The reel-type cutting units 6a and 6b are connected to forward ends of the first arm 33 and second arms 34, respectively.

Figure 6:
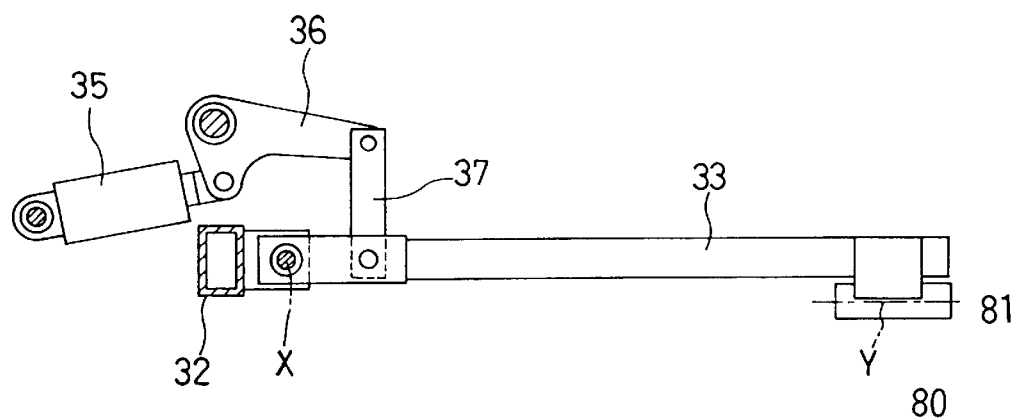
FIG. 6 is a side view of a lift structure for a first arm.
Figure 7:
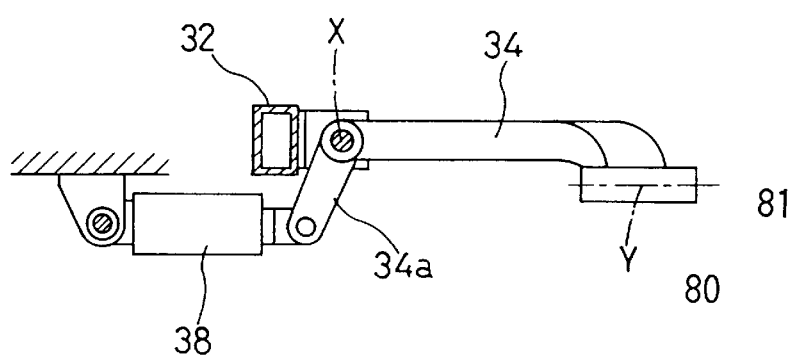
FIG. 7 is a side view of a lift structure for a second arm.

Specifically, as shown in FIG. 6, a lift arm 36 is disposed adjacent a proximal end portion of the first arm 33 to be raised and lowered by a first lift cylinder 35. The proximal end portion of the first arm 33 is suspended from the lift arm 36 through a link 37. As shown in FIG. 7, each of the right and left second arms 34 has an arm 34a connected to a proximal end portion to be pivotable therewith by a second lift cylinder 38. As shown in FIG. 5, each of the first arm 33 and second arms 34 has a forwardly opening channel-shaped support bracket 39 connected to a forward end thereof through a double tube joint 81 to be pivotable about a rolling axis Y extending in the fore and aft direction. The support bracket 39 supports a transversely middle position of a main frame 40 mounted in an upper position of the reel-type cutting unit 6 to be pivotable about a yawing axis Z extending vertically. That is, coupling means 80 for connecting the reel-type cutting units 6a and 6b to the respective arms 33 and 34 to be capable of rolling and yawing, include double tube joints 81 and support brackets 39.

Figure 3:
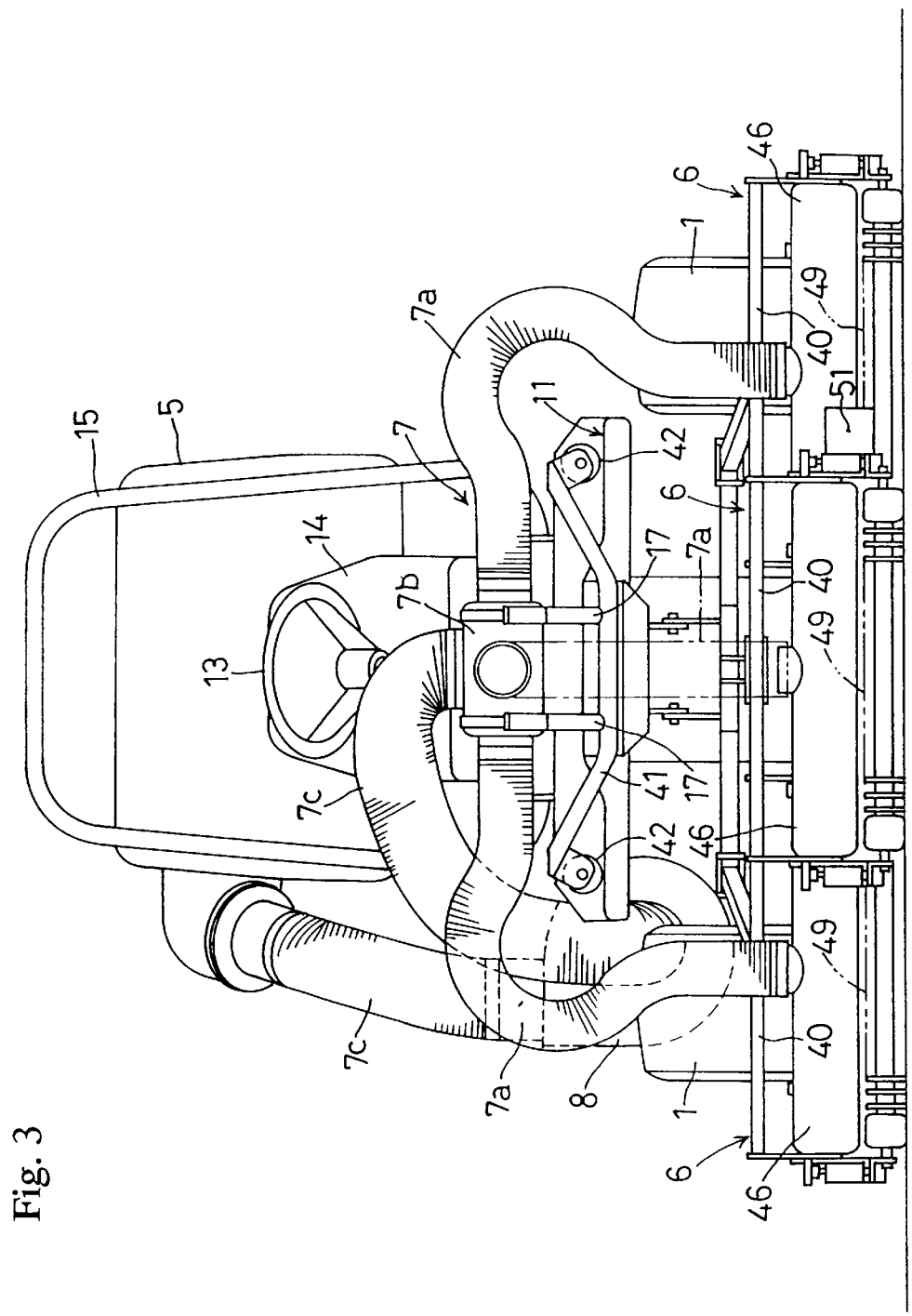
FIG. 3 is a front view of the lawn tractor.
Figure 4:
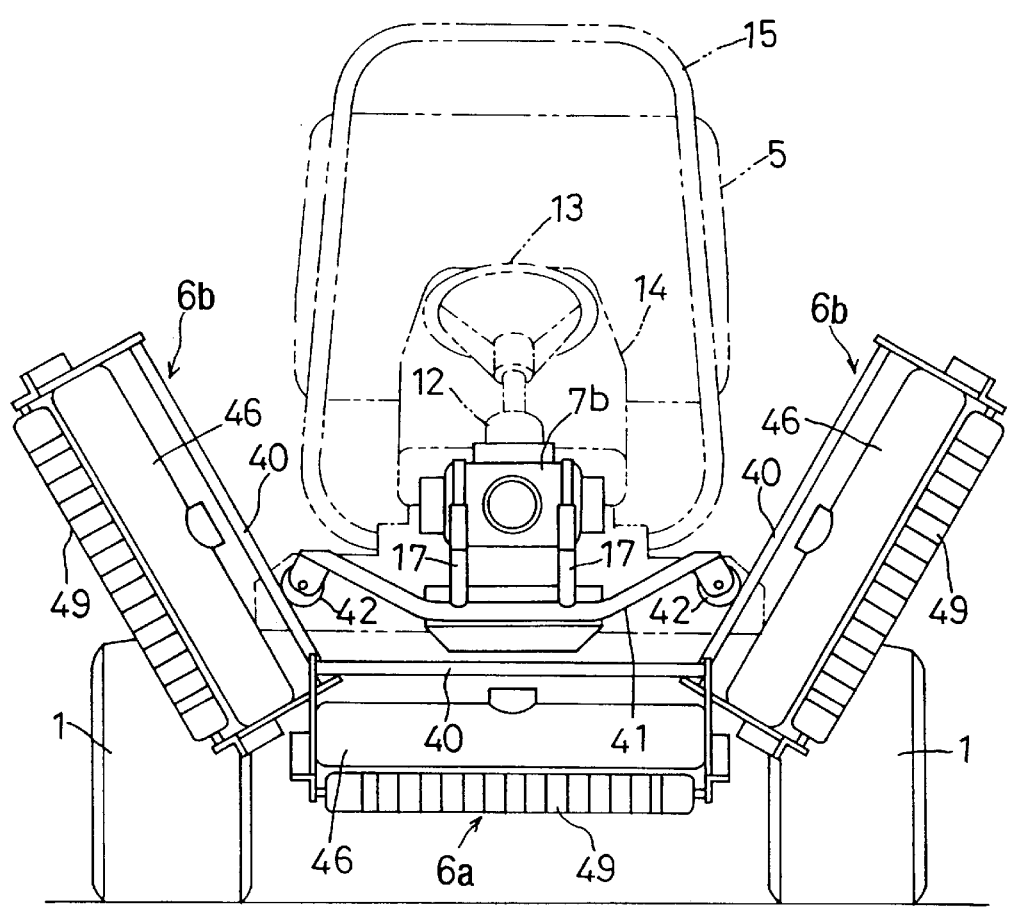
FIG. 4 is a front view showing reel-type cutting units in a raised position.

As shown in FIGS. 3 and 4, the vehicle body includes a frame 41 disposed at the forward end thereof, which is shaped to extend upward and transversely outward. The frame 41 supports, at opposite, right and left ends thereof, contact rollers 42 formed of an elastic material such as rubber and rotatable about fore and aft axes. For raising the three reel-type cutting units 6a and 6b, the first lift cylinder 35 and second lift cylinders 38 are extended at the same time. Then, as shown in FIG. 4, the contact rollers 42 contact the main frames 40 of side cutting units 6b, whereby the side cutting units 6b are swung about the rolling axes Y to inclined postures with the outward ends directed upward.

Figure 8:
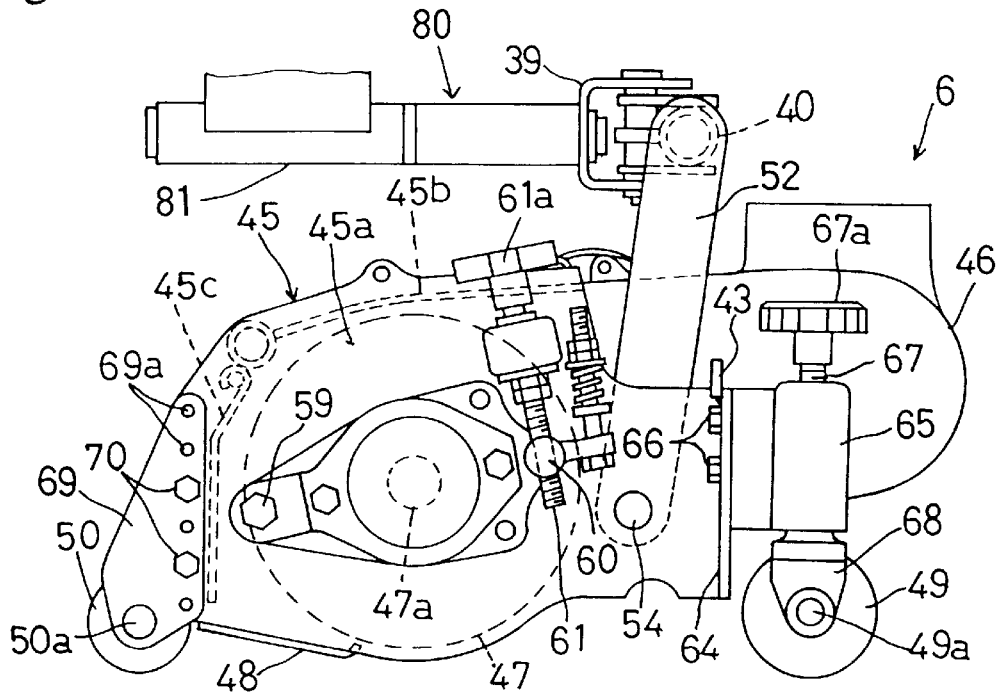
FIG. 8 is a side view of a reel-type cutting unit.
Figure 9:
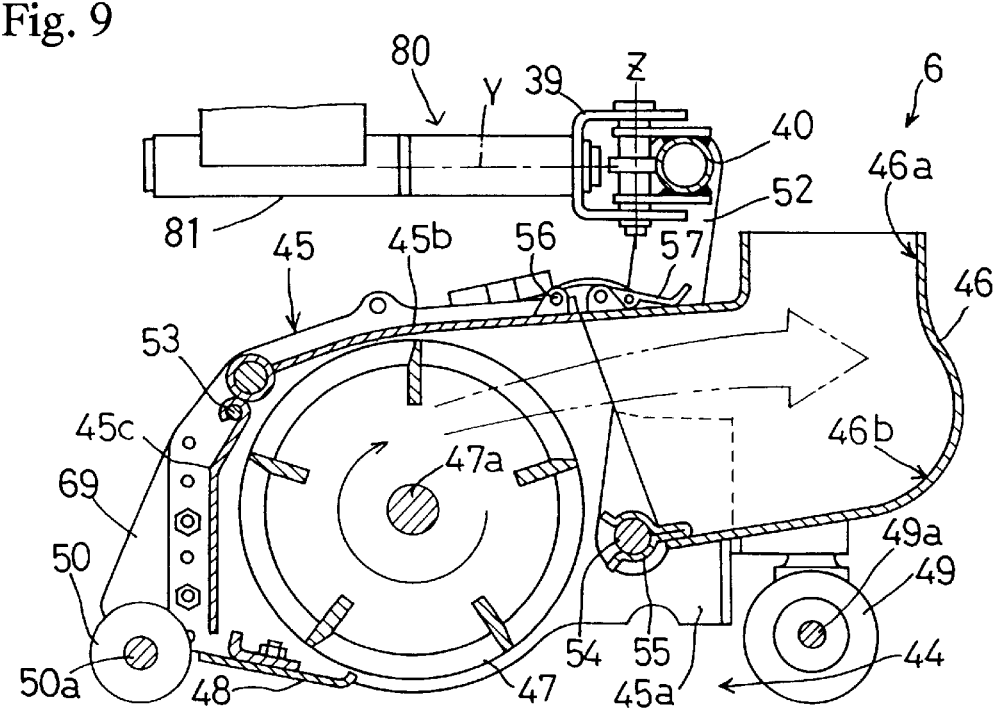
FIG. 9 is a side view in vertical section of the reel-type cutting unit shown in FIG. 8.
Figure 10:
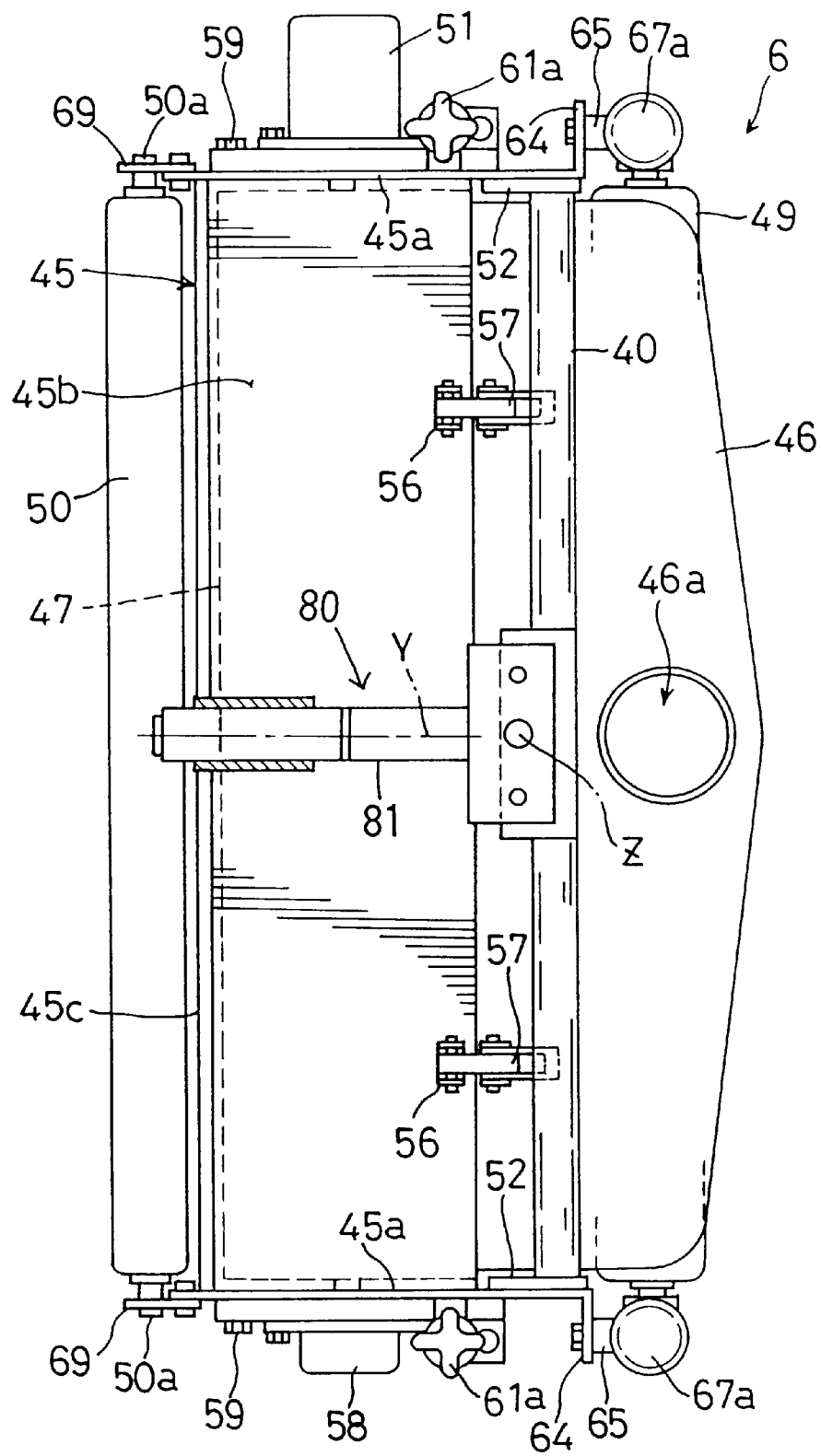
FIG. 10 is a plan view of the reel-type cutting unit.

The three reel-type cutting units 6a and 6b have substantially the same construction. The construction thereof will be described, taking the center cutting unit 6a for example. As shown in FIGS. 8 through 10, the reel-type cutting unit 6a has a case formed of a main case body 45 and a guide 46. The main case body 45 includes side wall members 45a arranged right and left, an upper wall member 45b and a rear wall member 45c. The guide 46 is detachably attached to the front of the main case body 45. A reel blade 47 is supported by the side wall members 45a to be rotatable about a transverse axis. A fixed blade 48 is disposed adjacent a lower periphery of the reel blade 47. A front ground-engaging roller 49 and a rear ground-engaging roller 50 acting as gauge wheels are disposed in a front position and a rear position, respectively. One of the side wall members 45a supports a hydraulic motor 51 for driving the reel blade 47. Props 52 extend upward from the side wall members 45a to be pivotal relative thereto about a rod 54 extending through front positions of the right and left side wall members 45a.

The main frame 40 extends parallel to the rotational axis of reel blade 47 and interconnects upper ends of the props 52. Thus, during an operation, the reel-type cutting unit 6a is capable of pitching about the rod 54 to follow the ground reliably. Further, the right and left side wall members 45a have stoppers 43 disposed in upper positions thereof for contacting the props 52 when the cutting unit 6a is raised from the ground, to set a limit to the pitching of the cutting unit 6a.

The rear wall member 45c is openable and closable by pivoting about a transverse axis 53. The guide 46 is shaped to a bag-like form communicating rearwardly with the interior of main case body 45, and defining a discharge opening 46a which opens upward in a front position. The first duct 7a is connected to the discharge opening 46a. The discharge opening 46a is disposed in a transversely middle position in plan view. Angled guide surfaces 46b are formed which project forward in the middle in plan view to guide grass clippings to the discharge opening 46a. The main case body 45 includes a rod 54 extending transversely in a lower position of a front opening thereof. The guide 46 includes a pair of right and left pinching elements 55 formed of a spring material and arranged at lower ends of a rear opening edge thereof for elastically holding the rod 54. The guide 46 further includes a pair of right and left buckles 57 arranged on an upper surface thereof for engaging a pair of engaging pieces 56 on the upper wall member 45a. Thus, the guide 46 is detachable attached to the main case body 45.

As shown in FIG. 9, a sufficient space is secured between the ground and the front positions of the right and left side wall members 45a to define an air inflow path 44.

The reel blade 47 is rotatable in the direction indicated by an arrow in FIG. 9. That is, the rotating direction is set so that the periphery opposed to the ground moves rearwardly of the vehicle body. In operation, grass clippings cut by the reel blade 47 and fixed blade 48 are transmitted upward from a lower position through a rear position in the case, by contact with the reel blade 47 or by wind pressure produced by rotation. The grass clippings are transmitted forwardly inside the guide 46 by a sufficiently strong feeding force. After being guided to the transversely middle position by the inclined surfaces 46b of guide 46, the grass clippings are transmitted upward from the discharge opening 46a. Subsequently, the grass clippings are transmitted to the grass catcher 5, to be collected therein, through the first duct 7a, merging member 7b, second duct 7c, suction blower 8 and receiving tube 16.

As shown in FIG. 10, the reel blade 47 has a drive shaft 47a supported at one end thereof by one of the side wall members 45a through a bearing 58 and at the other end by the other side wall member 45a through the hydraulic motor 51. The bearing 58 and hydraulic motor 51 are pivotably supported by support shafts 59 arranged on an axis disposed rearwardly of and extending parallel to the drive shaft 47a. Taking the side with the hydraulic motor 51 for example, as shown in FIG. 8, the side wall member 45a includes a screw shaft 61 meshed with a nut 60 disposed in a front position. By turning a knob 61a of screw shaft 61, the drive shaft 47a is vertically adjustable to adjust spacing with the fixed blade 48.

Figure 11:
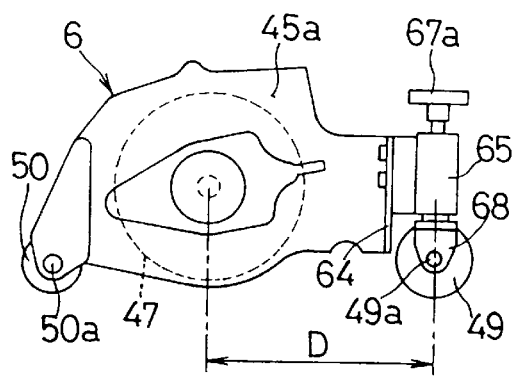
FIGS. 11a and 11b are side views showing two attaching positions of a front ground-engaging roller.
Figure 11:
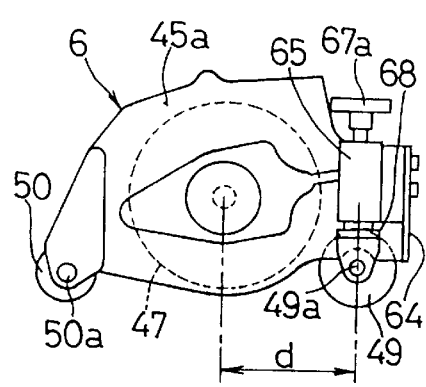
Figure 12:
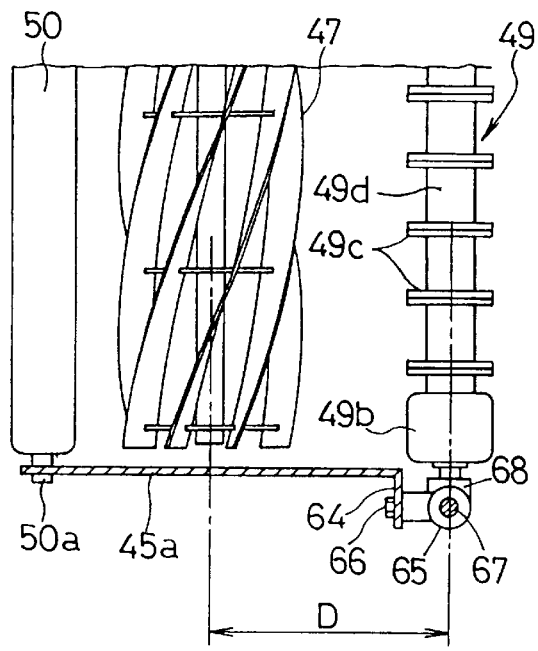
FIGS. 12a and 12b are plan views showing the two attaching positions of the front ground-engaging roller.
Figure 12:
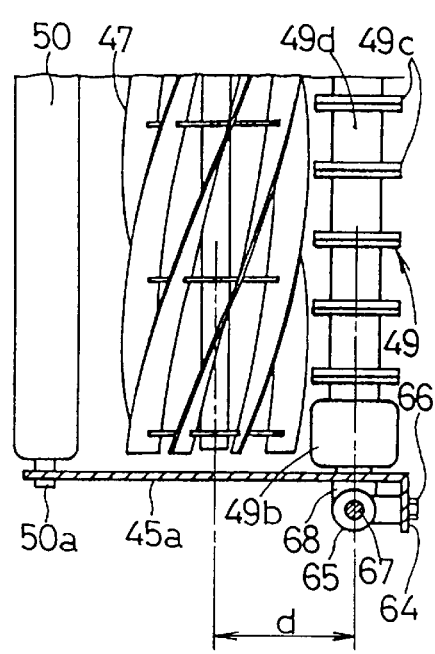

As shown in FIGS. 8, 11a and 12a, the front ground-engaging roller 49 has a support shaft 49a extending over an entire width thereof. The support shaft 49a supports metallic roller portions 49b arranged at opposite ends to be freely rotatable thereon, and grass pickup portions arranged in intermediate positions to be freely rotatable thereon which include alternately arranged large-diameter portions 49c and small-diameter portions 49d. The rear ground-engaging roller 50 has a constant diameter throughout, and is freely rotatably supported on a support shaft 50a. The forward ends of right and left side wall members 45a are bent laterally outward to define vertical support flanges 64. Support members 65 are fixed with bolts 66 to the front surfaces of right and left flanges 64. Screw shafts 67 extend vertically through the support members 65 in threaded engagement therewith, each screw shaft having a turn knob 67a disposed at an upper end thereof and a support piece 68 disposed at a lower end. The support shaft 49a of front ground-engaging roller 49 is supported by the right and left support pieces 68. As shown in FIGS. 11b and 12b, The support members 65 may be connected also to the rear surfaces of flanges 64.

That is, the flanges 64 define bores (not shown) for receiving the bolts 66. When the support members 65 are connected to the front surfaces of flanges 64, a grass cutting position of reel blade 47 and a ground-engaging point of front ground-engaging roller 49 have an increased distance D therebetween. When the support members 65 are connected to the rear surfaces of flanges 64, as shown in FIGS. 11b and 12b, the grass cutting position of reel blade 47 and the ground-engaging point of front ground-engaging roller 49 have a decreased distance d therebetween. With the increased distance D, time is provided to erect grass flattened under pressure of front ground-engaging roller 49, to cut the grass restored to an upstanding posture. With the decreased distance d, the cutting unit may follow even minor ruggedness of the ground with high precision. By turning the knobs 67a, an amount of downward projection of front ground-engaging roller 49 may be varied to adjust a grass cutting height.

As shown in FIGS. 8 and 9, a plate 69 defining numerous bores 69a arranged vertically is connected to an outer surface in a rearward position of each of the right and left side wall members 45a by means of bolts 70 penetrating selected bores 69a. The support shaft 50a of rear ground-engaging roller 50 is supported by the right and left plates 69. By selecting the bores 69a penetrated by the bolts 70, an amount of downward projection of rear ground-engaging roller 50 may be varied to adjust a grass cutting height.

Figure 13:
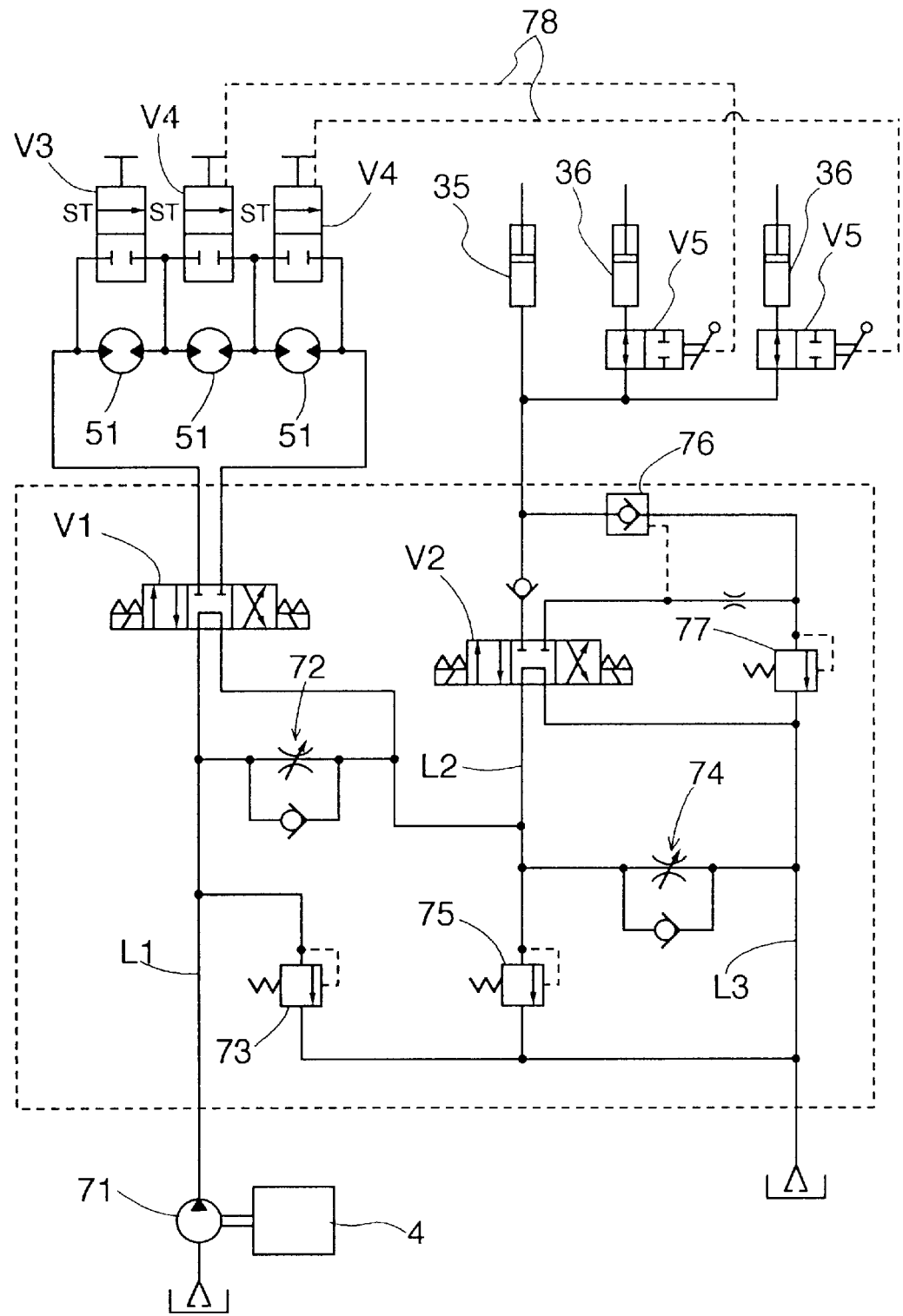
FIG. 13 is a diagram of a hydraulic circuit for controlling the reel-type cutting units.

FIG. 13 shows a hydraulic circuit for controlling the three hydraulic motors 51 and the first and second lift cylinders 35, 36 and 36. This hydraulic circuit includes a path for transmitting hydraulic oil from a hydraulic pump 71 driven by the engine 4, through a first oil line L1 and a first electromagnetic valve V1, to the three hydraulic motors 51 arranged in series. A second oil line L2 receives hydraulic oil branching off from the first oil line L1 and return oil from the first electromagnetic valve V1. A second electromagnetic valve V2 is mounted on the second oil line L2 for controlling the first and second lift cylinders 35, 36 and 36. A drain oil line L3 is formed for draining return oil from the second electromagnetic valve V2. This hydraulic circuit further includes switch valves V3, V4 and V4 for driving and stopping the three hydraulic motors of the center reel-type cutting unit 6a and right and left side reel-type cutting units 6b arranged transversely. A first variable throttle valve 72 is disposed between the first oil line L1 and second oil line L2 for adjusting driving speed of hydraulic motors 51. A first relief valve 73 is disposed between the first oil line L1 and drain oil line L3 for securing a driving pressure for the hydraulic motors 51. A second variable throttle valve 74 is disposed between the second oil line L2 and drain oil line L3 for adjusting raising speed of the first and second lift cylinders 35, 36 and 36. A second relief valve 75 is disposed between the second oil line L2 and drain oil line L3 for securing a driving pressure for the first and second lift cylinders 35, 36 and 36. A check valve 76 is mounted on an oil line branched from an oil line which transmits hydraulic oil from the second electromagnetic valve V2 to the first and second lift cylinders 35, 36 and 36, which check valve is opened by a pilot pressure when the first and second lift cylinders 35, 36 and 36 are in a lowering operation. A third relief valve 77 is disposed on a drain oil line side of the check valve 76 for applying a back pressure to the first and second lift cylinders 35, 36 and 36 to reduce a ground-engaging pressure of the reel-type cutting units 6a and 6b.

The first electromagnetic valve V1 is switchable to three positions for forward rotation, backward rotation and stopping of the hydraulic motors 51. The second electromagnetic valve V2 is operable to three positions for raising, lowering and stopping the reel-type cutting units 6a and 6b. In operation, the first electromagnetic valve V1 is set to the forward position to supply hydraulic oil to the respective hydraulic motors 51, and the second electromagnetic valve V2 is set to the lowering position to lower the reel-type cutting units 6a and 6b until the front and rear ground-engaging rollers 49 and 50 contact the ground. In this state, the cutting units, with the back pressure applied from the third relief valve 77, are lightly movable in flotation following any unevenness of the ground.

Descent stopper valves V5 are mounted on oil lines connected to the right and left second lift cylinders 36 and 36 for stopping drainage of hydraulic oil from the cylinders to prevent descent of the side cutting units 6b. The descent stopper valves V5 are interlocked to the switch valves V4 through restricting mechanisms 78 including wires and the like, to stop the hydraulic motors 51 of the side cutting units 6b when the stopper valves are closed. For carrying out an operation with only one of the side cutting units 6b maintained in the raised position, the second electromagnetic valve V2 is operated to supply hydraulic oil to the first and second lift cylinders 35, 36 and 36 to raise the three cutting units 6a and 6b, and thereafter the descent stopper valve V5 corresponding to the side cutting unit 6b to remain raised is closed to shut the oil line and open the corresponding switch valve V4 at the same time. As a result, even if the second electromagnetic valve V2 is switched to operate the first and second lift cylinders 35, 36 and 36 to the lowering position, descent of that side cutting unit 6b is stopped and the hydraulic motor 51 of the cutting unit 6b is stopped.

Thus, in this invention, the first and the second lift mechanisms for raising and lowering the center reel-type cutting unit 6a and side reel-type cutting units 6b include the first lift cylinder 35 and second lift cylinders 36 (one example of actuators) and the first arm 33 and second arms 34. For raising the three reel-type cutting units, the second electromagnetic valve V2 is operated to the raising position to operate the first lift cylinder 35 and the second lift cylinders 36 at the same time. This moves the first arm 33 and second arms 34 upward about the transverse axis. None of the reel-type cutting units 6a and 6b are displaced horizontally. Consequently, the riding lawn tractor according to this invention provides an increased overall cutting width, which is achieved by reducing the amount of overlap between the opposite sides of the cutting region of center reel-type cutting unit 6a and the cutting regions of side reel-type cutting units 6b.

Further, in this invention, an operation may be carried out with one of the right and left cutting units 6b maintained in the raised position. In this case, as noted above, the second electromagnetic valve V2 is operated to the raising position to raise all of the three cutting units 6a and 6b, the descent stopper valve V5 corresponding to the cutting unit to be maintained in the raised position is closed, and thereafter the second electromagnetic valve V2 is operated to the lowering position. When, in this state, the first electromagnetic valve V1 is operated to supply hydraulic oil to the hydraulic motors 51 acting as rotary actuators, the switch valve V4 of the hydraulic motor 51 of the corresponding cutting unit is opened by the restricting mechanism 78 in response to the closure of descent stopper valve V5. As a result, the cutting unit in the raised position is not driven. Especially since the reel-type cutting units 6a and 6b have the fixed blades 48 placed in contact with the rotating reel blades 47, the cutting unit 6 not in use is maintained out of operation to avoid heating due to a friction between reel blade 47 and fixed blade 48, thereby to protect the cutting unit 6a or 6b from damage.

[Other Embodiments]

Figure 14:
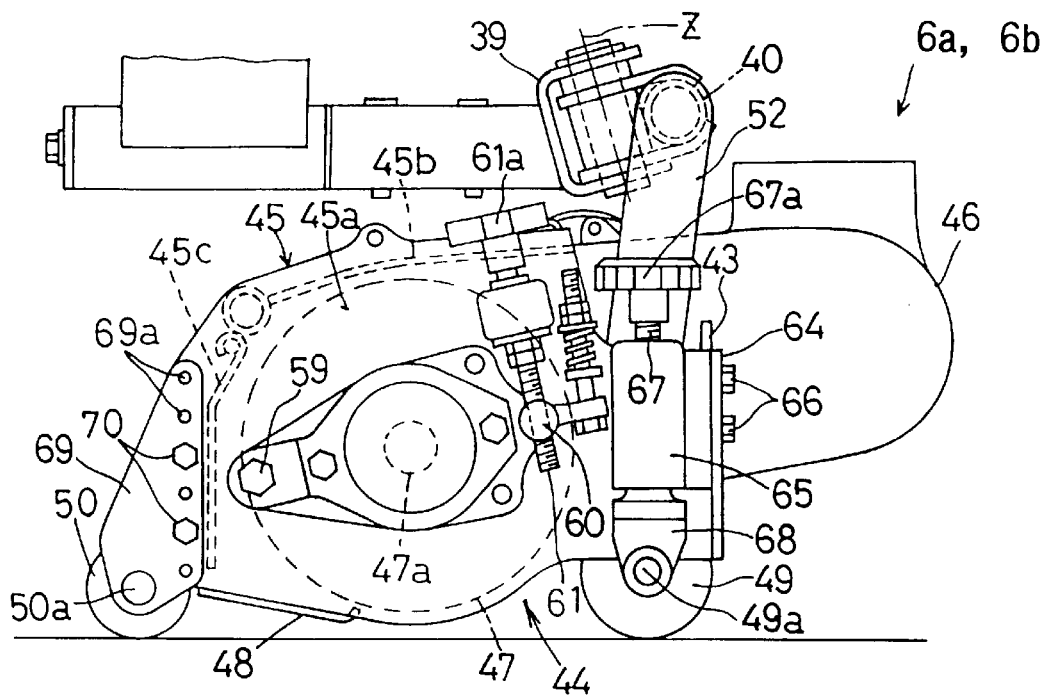
FIG. 14 is a side view of a reel-type cutting unit in another embodiment.
Figure 15:
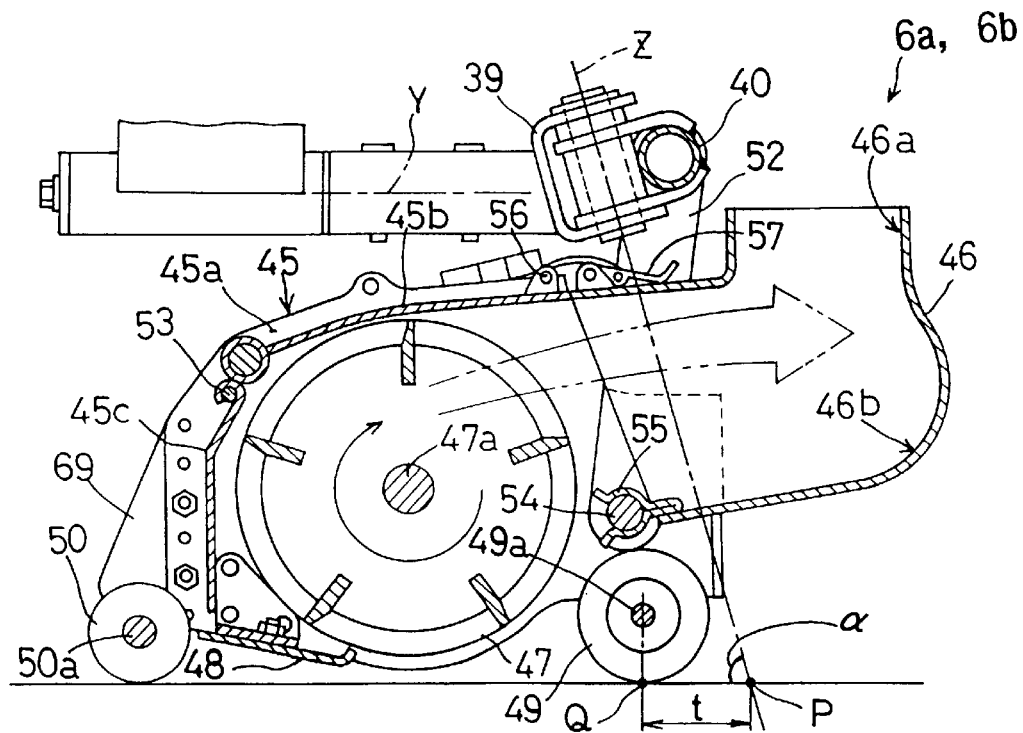
FIG. 15 is a side view in vertical section of the reel-type cutting unit shown in FIG. 14.

FIGS. 14 and 15 show reel-type cutting units 6a and 6b in another embodiment. The cutting units in this embodiment differ from the cutting units in the preceding embodiment in that the yawing axes Z are inclined to give a caster angle: α to the ground-engaging wheels of the cutting units. As shown, each yawing axis Z is inclined rearward by caster angle: α, and is set such that an intersection P of yawing axis Z and the ground lies forwardly of the ground-engaging point Q of front ground-engaging roller 49 (one example of ground-engaging wheels). That is, by setting the rearwardly inclined caster angle, a trail t is provided between intersection P and ground-engaging point Q. By dragging the cutting units 6a and 6b with the yawing axes Z providing points of traction, the cutting units may be dragged steadily without staggering. A compact cutting unit support is realized with the support bracket 39, which is the pulling part, drawn backward as much as possible so that the props 52 do not protrude excessively forward.

In a modified embodiment of this invention, a descent stopper valve V5 may be provided to maintain also the center reel-type cutting unit 6a in the raised position. Then, it is possible to carry out a grass cutting operation with the center cutting unit 6a raised and the side cutting units 6b placed in contact with the grounded, to obtain a so-called zebra cut.

According to this invention, the lift mechanisms may be adapted to raise and lower the reel-type cutting units in parallel posture relative to the vehicle body by using link mechanisms of the pantograph type or vertically elongated guide rails. This invention is applicable also to a riding lawn tractor having two reel-type cutting units or four or more reel-type cutting units.

What is claimed is:

1. A lawn tractor comprising:
    a vehicle body;
    a center reel-type cutting unit positioned forwardly of and at a lateral center of said vehicle body;
    side reel-type cutting units arranged forwardly of said vehicle body and laterally of and displaced in a fore-aft direction with respect to said center reel-type cutting unit with respect to a moving direction of said vehicle body, wherein a cutting track by said center reel-type cutting unit and cutting tracks by said side reel-type cutting units partly overlap one another;
    a first lift mechanism for connecting said center reel-type cutting unit to said vehicle body such that said center reel-type cutting unit is pivotable about a fore-aft extending axis; wherein said first lift mechanism is operable to raise and lower said center reel-type cutting unit without displacing said center reel-type cutting unit transversely of said moving direction; and
    second lift mechanisms for connecting said side reel-type cutting units to said vehicle body such that each said side reel-type cutting unit is pivotable about a fore-aft extending axis, respectively, wherein said second lift mechanisms are operable to raise and lower said side reel-type cutting units without displacing said side reel-type cutting units transversely of said moving direction
    wherein said first and second lift mechanisms are capable of automatically following a vertical displacement of the grounds to raise and lower said respective cutting units according to different contours of the ground.

2. A lawn tractor as defined in claim 1, wherein said first lift mechanism includes a first arm pivotable about a first pivotal axis extending transversely of said moving direction, said center reel-type cutting unit being attached to a free end of said first arm through coupling means, and
    each of said second lift mechanisms includes a second arm pivotable about a second pivotal axis extending transversely of said moving direction, each of said side reel-type cutting units being attached to a free end of said second arm through coupling means.

3. A lawn tractor as defined in claim 2, wherein said pivotal axis of said first arm and said pivotal axis of said second arm are coaxial.

4. A lawn tractor as defined in claim 1, wherein each of said center reel-type cutting unit and said side reel-type cutting units has an operative position and a running position, and includes a restricting mechanism for stopping a reel blade when said running position is assumed.

5. A lawn tractor as defined in claim 2, wherein each said coupling means have a yawing axis (Z) for permitting each of said reel-type cutting units to yaw relative to said vehicle body.

6. A lawn tractor as defined in claim 5, wherein each said yawing axis (Z) is inclined to give a caster angle to a ground-engaging wheel of each of said reel-type cutting units.

7. A lawn tractor as defined in claim 5, wherein each said coupling means have a rolling axis (Y) for permitting each of said reel-type cutting units to roll relative to said vehicle body.

8. A lawn tractor as defined in claim 1, wherein said first lift mechanism includes an arm pivotable about a transverse axis, one end of said arm being connected to said center reel-type cutting unit and wherein said transverse axis is positioned rearwardly of a front edge of front wheels of said tractor.

9. A lawn tractor as defined in claim 1, wherein said first lift mechanism includes an arm pivotable about a transverse axis, one end of said arm being connected to said center reel-type cutting unit and wherein said transverse axis is supported directly to a body frame of said tractor.

10. A lawn tractor as defined in claim 1, wherein each said second lift mechanisms includes a second arm pivotable about a transverse axis, said second arm having a forwardly-extending portion extending from a portion of said transverse axis, and a laterally-extending portion extending laterally from a forward end of said forwardly-extending portion, and wherein said side reel-type cutting unit is connected to a lateral end portion of said laterally extending portion.

11. A lawn tractor comprising;
    a vehicle body;
    a center reel-type cutting unit;

side reel-type cutting units arranged laterally of said center reel-type cutting unit with respect to a moving direction of said vehicle body, wherein a cutting track by said center reel-type cutting unit and cutting tracks by said side reel-type cutting units partly overlap one another;

a first lift mechanism for vertically movably connecting said center reel-type cutting unit to said vehicle body, respectively, wherein said first lift mechanism is operable to raise and lower said center reel-type cutting unit without displacing said center reel-type cutting unit transversely of said moving direction; and second lift mechanisms for vertically movably connecting said side reel-type cutting units to said vehicle body, respectively, wherein each said second lift mechanism having a rolling axis generally extending in a fore-aft direction, and wherein each of said second lift mechanisms is operable to raise corresponding one of said side reel-type cutting units to a predetermined height without displacing said side reel-type cutting units transversely of said moving direction and is operable to cause said corresponding one of said side reel-type cutting units to pivot about said rolling axis as said second lift mechanism raises said corresponding one of said side reel-type cutting units beyond said predetermined height.

12. A lawn tractor comprising;

a vehicle body;

a center reel-type cutting unit positioned in front of and at a lateral center of said vehicle body;

side reel-type cutting units arranged laterally of said center reel-type cutting unit with respect to a moving direction of said vehicle body, wherein a cutting track by said center reel-type cutting unit and cutting tracks by said side reel-type cutting units partly overlap one another;

a first lift mechanism including a first lift cylinder for vertically movably connecting said center reel-type cutting unit to said vehicle body, wherein said first lift mechanism is operable to raise and lower said center reel-type cutting unit without displacing said center reel-type cutting unit transversely of said moving direction; and second lift mechanism including a second lift cylinder for vertically movably connecting said side reel-type cutting units to said vehicle body, respectively, wherein said second lift mechanisms are operable to raise and lower said side reel-type cutting units without displacing said side reel-type cutting units transversely of said moving direction a hydraulic unit for actuating said first and second lift cylinders, said hydraulic unit having means for allowing each of said first and second lift cylinders to respond to vertical movements of corresponding one of said cutting units thereby allowing each of said center reel-type cutting unit and side reel-type cutting units to follow unevenness of the ground.

* * * * *